United States Patent
Tricarico et al.

(10) Patent No.: US 6,642,470 B2
(45) Date of Patent: Nov. 4, 2003

(54) PROCESS AND DEVICE FOR MACHINING A THREE-DIMENSIONAL PIECE BY ELECTROEROSIVE MILLING

(75) Inventors: Claudio Tricarico, Nyon (CH); Roger Delpretti, Vernier (CH)

(73) Assignee: Charmilles Technologies S.A., Meyrin (CH)

( * ) Notice: Subject to any disclaimer, the term of this patent is extended or adjusted under 35 U.S.C. 154(b) by 0 days.

(21) Appl. No.: 10/086,898

(22) Filed: Mar. 4, 2002

(65) Prior Publication Data

US 2002/0162824 A1 Nov. 7, 2002

(30) Foreign Application Priority Data

Mar. 5, 2001 (EP) .............................. 01105252

(51) Int. Cl.[7] .............................. B23H 1/00; B23H 7/20
(52) U.S. Cl. .................................. 219/69.17; 219/69.16
(58) Field of Search .......................... 219/69.16, 69.17, 219/69.13; 700/162, 175, 176

(56) References Cited

U.S. PATENT DOCUMENTS

| 5,354,961 A | * 10/1994 | Diot et al. ............... 219/69.13 |
| 5,763,843 A | 6/1998 | Yuzawa et al. .......... 219/69.16 |
| 5,847,352 A | 12/1998 | Yuzawa et al. .......... 219/69.17 |
| 5,911,888 A | 6/1999 | Girardin |
| 5,919,380 A | 7/1999 | Magara et al. ........... 219/69.16 |
| 6,184,486 B1 | * 2/2001 | Diot et al. ............... 219/69.13 |
| 6,521,856 B1 | * 2/2003 | Marchesi et al. ........ 219/69.13 |

FOREIGN PATENT DOCUMENTS

| CH | 689 182 | 11/1998 | |
| EP | 0 555 818 | 8/1993 | |
| EP | 0 639 420 | 2/1995 | |
| JP | 4-53631 A | * 2/1992 | .............. 219/69.17 |
| JP | 9-123025 | 5/1997 | |

* cited by examiner

*Primary Examiner*—Geoffrey S. Evans
(74) *Attorney, Agent, or Firm*—Young & Thompson

(57) ABSTRACT

An electroerosion machining device to machine a piece (14) by milling successive layers includes a member (30) to drive in rotation an electrode-tool (31) of tubular shape and a digital control unit (CN) to control the three-dimensional movement (x, y, z) between the electrode-tool and the piece (14). A regulation module (MR) is adapted to simulate the longitudinal wear of the electrode-tool and to compensate it along its path. According to the type of geometric configuration between the electrode-tool and the piece, namely the presence or absence of an opening below the electrode-tool and the presence or absence of one or two walls, different values of longitudinal wear are provided and transmitted to the digital control unit (CN). There is thus obtained a high precision and planarity of machining.

18 Claims, 3 Drawing Sheets

PROCESS AND DEVICE FOR MACHINING A THREE-DIMENSIONAL PIECE BY ELECTROEROSIVE MILLING

BACKGROUND OF THE INVENTION

The present invention relates to a process for machining a three-dimensional piece by milling by means of an electroerosion device according to which an electrode tool of cylindrical shape is driven in rotation, whose diameter is small relative to the dimensions of the surfaces to be eroded, there is controlled by means of digital control unit the three-dimensional movement relative to the electrode-tool and said piece, there are recorded by computer means the shapes to be machined in the form of superposition of virtual layers, a trajectory of the electrode-tool is simulated such that this latter sweeps groove by groove, successively each of the virtual layers, and the corresponding control signals are transmitted to the digital control unit to carry out layerwise machining, there is simulated by regulation means the longitudinal wear of the electrode tool along its path and corresponding compensation signals are transmitted toward the digital control unit so as to compensate this longitudinal wear and to maintain the movement of the end of the electrode-tool parallel to said layers.

DESCRIPTION OF THE RELATED ART

This machining process, commonly called EDM (Electric Discharge Machining) milling is for example described in EP 0 555 818, CH 689 182 and U.S. Pat. No. 5,911,888 of the applicant. The experience in the field of EDM milling has shown that it is possible to compensate continuously the wear of a tool that is cylindrical or in the form of a tube.

The fundamental hypothesis consists in considering that the volumetric wear is constant and the profile of the tube is substantially unvariable. As a result, by knowing the volume of material to be machined on the workpiece, there can be known in advance the wear of the electrode and hence that can be compensated stepwise.

By machining more and more complex pieces, it has been possible to determine the limits of validity of the initial hypothesis, which has proved very quickly to be insufficient when it is a matter of achieving planarity near or less than a hundredth of a millimeter.

In the case of complex geometries, the machining conditions of a piece by EDM milling can change dramatically and affect sufficiently the quantity of longitudinal wear of the electrode-tool such that the stack of successive layers gives rise to considerable errors of planarity.

SUMMARY OF THE INVENTION

The present invention has for its object to overcome these drawbacks and to obtain an EDM milling process permitting high precision and planarity of machining.

The process according to the invention is characterized to this effect by the fact that there are provided several values for longitudinal wear of the electrode-tool according to the mutual geometric configuration between the electrode-tool and the surrounding material of said piece, and that compensation signals corresponding to each of these values are transmitted to the digital control unit.

The use of several typical values for longitudinal or volumetric wear of the electrode-tool as a function of the type of geometric configuration encountered by the electrode-tool, permits obtaining a very flat movement of the end of the electrode-tool, and hence a high precision of machining.

Preferably, said values take account on the one hand of the presence or absence of an opening in the surrounding material located below the end of the electrode-tool, facilitating the flow of the machining liquid, and on the other hand of the presence or absence of at least one or two walls of the surrounding material located at a distance from the electrode-tool which is smaller than a first predetermined distance.

Thanks to these characteristics, it is possible to take account of the principal factors influencing the wear of the electrode-tool and hence increasing precision of the EDM milling.

According to a preferred embodiment, the values of longitudinal wear are fixed for the following geometric configurations:

a first configuration defined by the presence of at least two walls spaced apart a distance less than a second maximum distance predetermined by the absence of an opening below the electrode-tool;

a second configuration defined by the presence of at least two walls spaced by a distance less than a second predetermined maximum distance and by the presence of an opening below the electrode-tool;

a third configuration defined by the absence of a wall located at a distance less than the first predetermined distance of the electrode-tool and the presence of an opening below the electrode-tool;

a fourth configuration defined by the presence of a wall located at a distance less than the first predetermined distance of the electrode-tool and the presence of an opening below the electrode-tool;

a fifth configuration defined by the presence of a wall located at a distance less than the first predetermined distance and the absence of an opening below the electrode-tool;

a sixth configuration defined by the absence of a wall located at a distance less than the first predetermined distance and by the absence of an opening below the electrode-tool.

Preferably, the values of longitudinal wear are also fixed for the following configurations:

a seventh configuration to machine the material left at the end of the preceding geometric configurations and between these latter; and an eighth configuration to carry out one or several finishing machinings.

This small number of cases of geometric configurations permits segmenting or deconstructing the machining into regions within which the longitudinal wear or volumetric wear can be approached with excellent precision.

Preferably, there is fixed for each of the geometric configurations a value of longitudinal wear by machining with pre-established values, by measuring the actual longitudinal wear for the geometric configurations and by replacing the pre-established values by the measured values of the longitudinal wear.

These characteristics permit correcting variations of longitudinal or volumetric wear due to numerous other factors, for example variations of temperature, of the degree of contamination of the machining liquid by machining waste, of the degradation of carbonated machining liquids due to electroerosive discharge, etc.

The present invention generally relates to a device for machining by electroerosion to machine a three-dimensional piece by milling by electroerosion by layers, comprising
- a member to drive in rotation an electrode-tool of cylindrical shape whose diameter is small relative to the dimensions of the surfaces to be eroded,
- a digital control unit adapted to control the three-dimensional relative movement of the electrode-tool and the piece,
- a computer module permitting recording the shapes to be machined in the form of a superposition of virtual layers,
- a simulation module permitting simulating a trajectory of the electrode-tool such that the latter sweeps groove by groove, successively each of the virtual layers and arranged to transmit corresponding control signals to the digital control unit,
- a regulation module permitting simulating the longitudinal wear of the electrode-tool and its compensation along its path and to transmit toward the digital control unit compensation signals so as to regulate and compensate this longitudinal wear to maintain the movement of the end of the electrode-tool parallel to said layers, characterized by the fact that the regulation module is arranged to provide several values of longitudinal wear of the electrode-tool according to the mutual geometric configuration between the electrode-tool and the surrounding material of the piece and to transmit compensation signals corresponding to each of these values to the digital control unit.

Other advantages will appear from the characteristics expressed in the dependent claims and from the description given hereafter of the invention in greater detail, with reference to the drawings, which show schematically and by way of example one embodiment.

DESCRIPTION OF THE PREFERRED EMBODIMENTS

Figure 1:
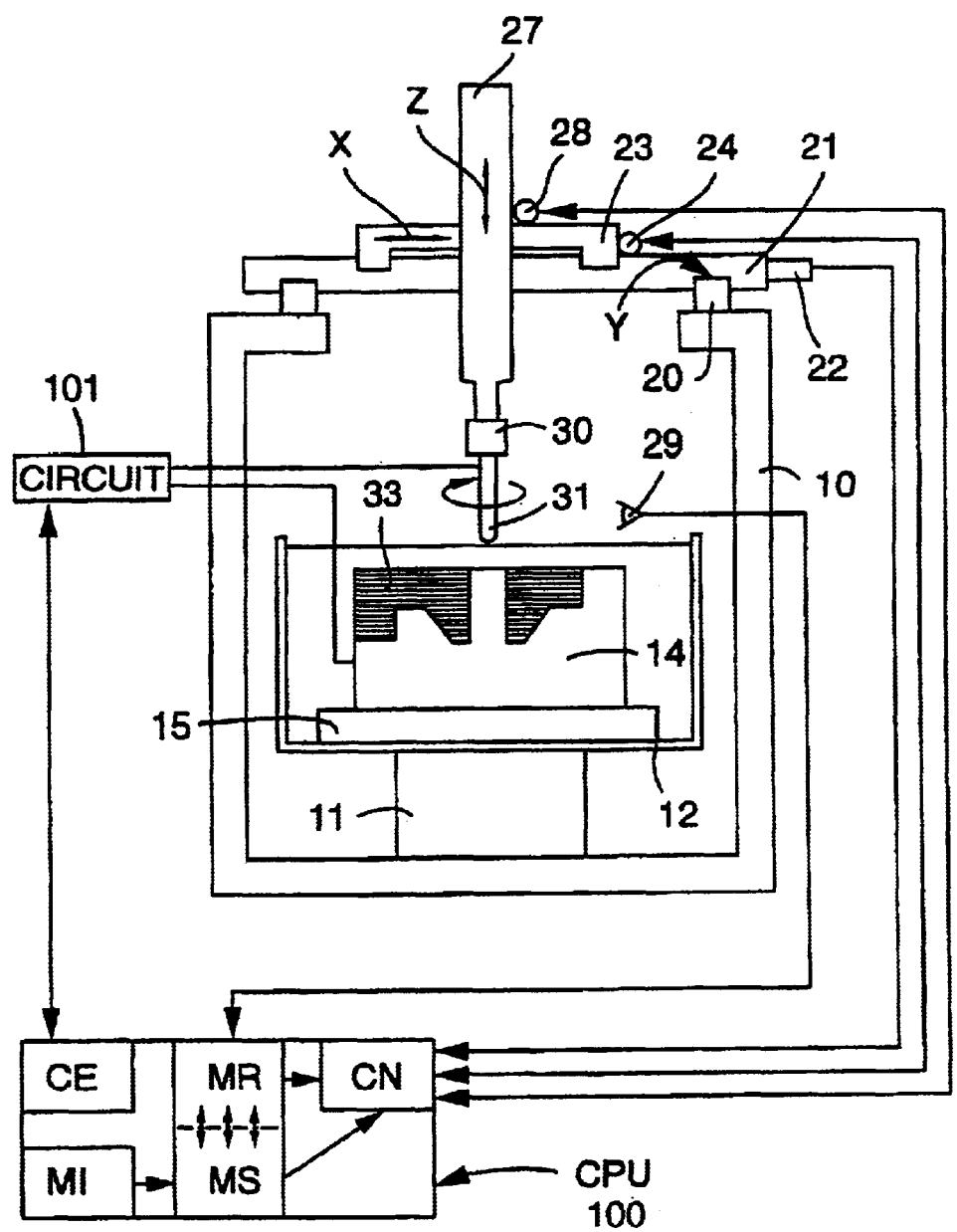
FIG. 1 shows schematically a device for machining by EDM milling according to the invention.

The embodiment of the electroerosion device shown in FIG. 1 comprises a frame 10 in which is disposed on a column 11 a reservoir 12 containing machining liquid or dielectric liquid. In this reservoir, a piece 14 to be machined is fixed on a table 15.

The upper portion of the frame 10 has two rails 20 on which is mounted a support 21 adapted to slide in a direction Y and driven by a motor 22. A carriage 23 is slidably mounted on the support 21 in a direction X and driven accordingly by a motor 24.

A tool holding member 27 is arranged slidably in a direction Z in the carriage 23 and is driven vertically by a motor 28.

The tool holding member 27 comprises a rotatable motor driven spindle 30 in which is held removably an electrode-tool 31 of tubular cylindrical shape. Thanks to this arrangement, there are obtained relative translatory movements in the three directions X, Y, Z, between the whose diameter is small relative to the dimensions of the surface to be machined or of the cavity to be eroded.

An electric circuit CG is connected galvanically to the electrode-tool 31 and to the piece 14 to be machined and arranged to start and maintain erosive discharges between the electrode-tool 31 and the piece 14.

A control unit CPU 100 comprises for this purpose an electronic control module CE permitting controlling the parameters of the different electrical components of the electrical circuit CG 101.

The control unit also comprises a digital control module CN adapted to control the three-dimensional relative movements between the electrode-tool 31 and the piece 14 to be machined and arranged to send corresponding control signals to the three motors 22, 24, 28.

A computer module MI which can be included in the control unit CPU permits recording the geometric shapes which are to be given, starting from the piece in the form of a superposition of virtual layers 33. The thickness of these layers 33 can vary between several millimeters for rough machining and several micrometers for finishing.

Connected to the preceding module, the control unit CPU comprises a simulation module MS arranged on the one hand to simulate a trajectory of the electrode-tool 31 such that the end of this latter sweeps groove by groove successively each of the virtual layers and, on the other hand, to transmit corresponding control signals to the digital control module CN so as to carry out this layer by layer sweeping. This simulation module MS, as well as the computer module, can be integrated into CAD/CAM software of which several types are known, such as that sold by the company CN Industries, 254 rue Francis de Pressensé, F—63625 Villeurbanne—CEDEX, France.

The control unit moreover comprises a regulation module MR which permits on the one hand simulating the longitudinal wear of the electrode-tool 31 and its compensation along its path and, on the other hand, transmitting toward the digital control module CN compensation signals so as to regulate and compensate this longitudinal wear to maintain the movement of the end of the electrode-tool 31 parallel to said layers 33. It is of interest with this type of machining by "EDM milling" by layers, to machine with a strongly erosive regime, in general with a volumetric amount of 20 to 50%, because this permits the very rapid appearance of the asymptotic shape of the end of the electrode-tool 31 and with a high speed of revolution which can reach several thousands of RPMs. Nevertheless, the use of weakly erosive regimes remains evidently possible according to the case in question, for example for corrections of errors of planarity in the thin layers.

The general technique of this type of machining by EDM milling by a rotatable electrode-tool, is in particular described in EP 0 555 818, CH 689 182 and U.S. Pat. No. 5,911,888 in the name of the applicant and whose content forms an integral part of the present application.

According to the present invention, the regulation module MR is arranged to provide several values of longitudinal wear of the electrode-tool 31 according to the type of mutual geometric arrangement between the electrode-tool and the environmental material of the piece to be machined and to transmit corresponding wear compensation signals at each of these values, to the digital control module CN.

These values of longitudinal or volumetric wear take account in particular of the geometric configuration and of the flow of machining liquid between the electrode-tool 31 and the piece 14 to be machined. The invention consists in particular in selecting typical situations within which the conditions of flow of the machining liquid remain substantially constant by virtue of the local topology. In known devices, a single value of longitudinal wear was provided for all the surface of a layer. On the contrary, the device according to the present invention provides different values of longitudinal or volumetric wear and for its compensation, for each geometric region, segment or zone according to the geometric configuration between the electrode-tool and the surrounding material of the piece. Moreover, for these different cases of figures, other particular machining parameters could be provided, for example different machining regimes, different gaps, different rugosities, etc.

Thus the regulation module MR is arranged so as to take account, during simulation and establishment of the values of longitudinal wear a) of the presence or absence of an opening in the surrounding material located below the end of the electrode-tool 31 facilitating the flow of machining liquid and b) of the presence or absence of at least one or two walls of the surrounding material located at a distance from the electrode-tool which is smaller than a first predetermined distance.

In the present embodiment, the electrode-tool is in the form of a hollow tube provided with an axial bore and the values of longitudinal wear take account of the presence or absence of communication for the machining liquid between this axial bore and an opening in the surrounding material.

Thus the regulation module is arranged so as to provide a value of longitudinal wear for each of the geometric configurations 1 to 6 as follows, namely

| opening<br>wall | absence of opening | presence of<br>opening |
|---|---|---|
| presence of two parallel walls | 1. configuration | 2. configuration |
| presence of one wall | 5. configuration | 4. configuration |
| absence of a wall | 6. configuration | 3. configuration | or the presence of a wall means that this latter is located at a distance less than or equal to a first predetermined distance d1 of the electrode-tool; and in which the presence of two walls means that the two walls are spaced apart by a distance less than or equal to a second maximum predetermined distance d2.

The first predetermined distance d1 could be fixed at d1=g and the second maximum predetermined distance at d2=2(R+g)

in which

R is the external radius of the electrode-tool, g is the gap.

These six geometric configurations and two supplemental geographic configurations are shown in FIGS. 2A to 2H.

Figure 2A:
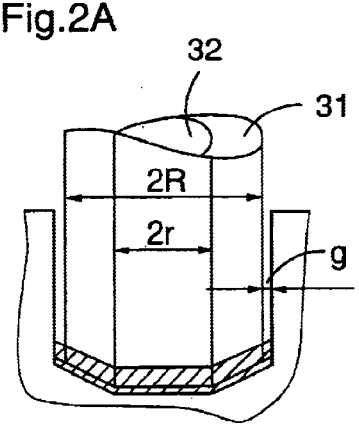
FIGS. 2A to 2H are cross-sectional views showing eight different types of geometric configurations between the electrode-tool and the surrounding material of the piece to be machined.
Figure 2B:
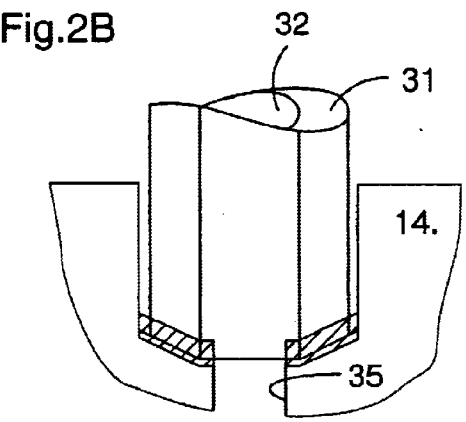

The first configuration shown in FIG. 2A corresponds to a straight closed groove. The electrode-tool machines in immediate adjacency to the two walls of the piece on opposite sides. Moreover, the axial bore 32 of the electrode-tool is closed by the bottom of the layer. The material removed during machining is indicated in hatched lines. The two walls of the groove are separated by a distance 2 (R+g).

As a modification, the groove could also have a wider distance, for example less than or equal to 2 (R+r+g), which corresponds to a groove obtained by moving the electrode-tool back and forth with an offset of 2r between movement in one direction and movement in the opposite direction, 2r being the internal diameter of the electrode-tool. This case corresponds to a wide groove and constitutes an intermediate case with the fifth configuration.

The second configuration (FIG. 2B) is similar to the previous one with the difference that the axial bore 32 communicates with an opening or slot 35 that preexists in the piece 14 to be machined.

Figure 2C:
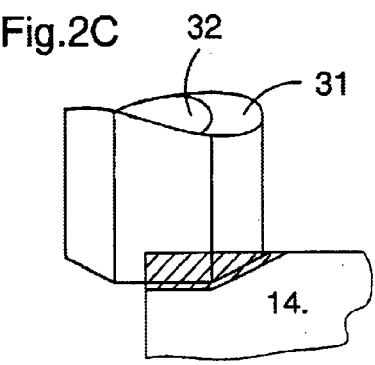

The third configuration show in FIG. 2C corresponds to an exposed edge of the blank. There is no wall adjacent the electrode-tool 31 which machines with the open axial bore at the edge of the blank.

Figure 2D:
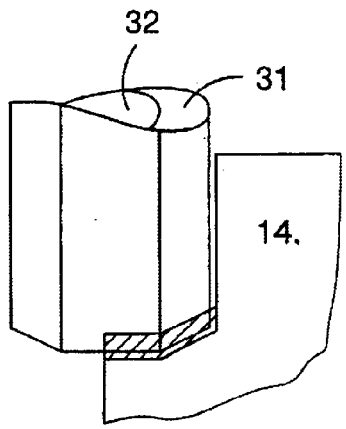
Figure 2E:
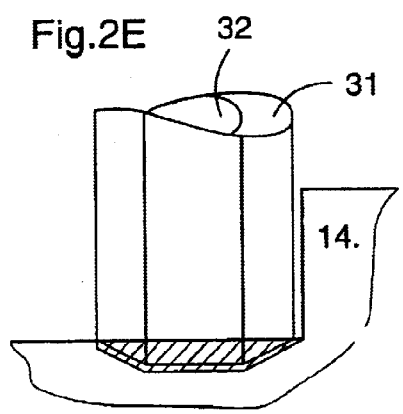

The fourth configuration shown in FIG. 2D corresponds to the exposed edge of the piece. The electrode-tool 31 machines with an open axial bore against a wall of the finished piece.

The fifth configuration (FIG. 2E) corresponds to the case of the exposed edge of the piece. The electrode-tool 31 machines against a finished edge of the piece whilst having its axial bore open on one side.

Figure 2F:
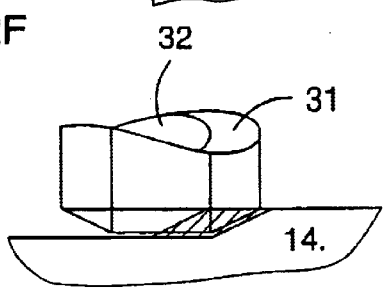
Figure 2G:
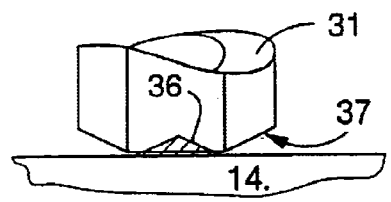
Figure 2H:
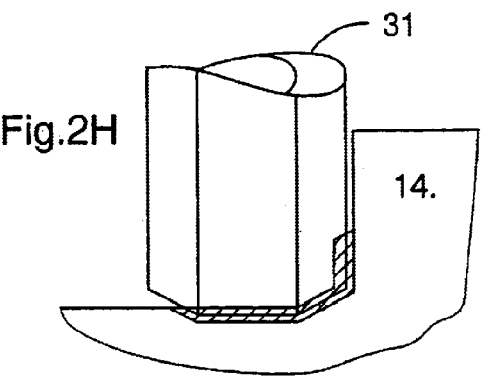

The sixth configuration shown in FIG. 2F corresponds to a case of sweeping a surface. The axial bore 32 is closed on one side and the electrode-tool 31 sweeps the spaced regions, on the one hand toward the interior of the periphery of the edge of the piece 14 and on the other hand toward the outside of the finished piece.

A seventh configuration corresponds to the intermediate remainders. The electrode-tool 31 machines the projection 36 of the material that may be left at the end edge of the preceding configurations. These remainders arise particularly from certain procedures because the computation of the path of the electrode-tool is made for a cylindrical tool, whilst in reality the electrode-tool has, after a certain short initial phase, a truncated conical 4: front portion 37.

The eighth configuration relates to the case of finishing in which the electrode-tool 31 moves along the edge of the workpiece with a reduced lateral offset, and this with a machining regime that is finer, for the purpose of smoothing the roughness of the preceding regime. It is to be noted that it is not necessary, for this configuration, to distinguish an open operation from a closed one. This is not the bottom of the layer which is removed but only the lateral portion of the layer in question. On one hand, an error of altitude is unimportant, on the other hand, the volume to be machined is negligible. As a result, fluctuations of altitude due to variations of volumetric wear are also negligible.

Thus the regulation module MR will have eight different values of longitudinal wear of the electrode-tool. The simulation module MS is arranged to determine for each layer to be machined the location of the different zones, regions or segments, within which a given configuration is present.

Thus the modules for simulation and regulation are programmed to control the path of the electrode-tool in these zones, regions or segments by applying a given value of longitudinal wear corresponding to each geometric configuration so as to obtain an exact compensation of the real wear of the electrode-tool.

In the embodiment shown, the simulation and regulation modules are programmed to carry out machining of the zones of each layer in increasing order starting from the first until the last configuration. However, so as to simplify programming, if necessary, the first five configurations can be rearranged provided that the three last retain their place in the sequence. Such a compromise will give less desirable geometric results.

Moreover, the regulation module MR is arranged to begin machining with pre-established values of longitudinal or volumetric wear for each of the geometric configurations. There are then carried out measurements of the real longitudinal wear for each of the geometric configurations and the pre-established values are replaced by measured values of the longitudinal wear. The device for machining by electroerosion comprises for this purpose a measuring member 29 permitting measuring the length and hence the real wear of the electrode-tool 31. This measuring member 29 could be of any optical, mechanical, electrical type, etc. The measurement of this length and of the real wear of the electrode-tool can be carried out periodically, for example once per layer for each zone or geometric configuration.

FIGS. 3A to 3F show the simulation of execution of the path of the electrode-tool during machining at different steps of a layer of material by machining zones with an increasing configuration and starting from the first configuration until the eighth configuration.

Figure 3A:
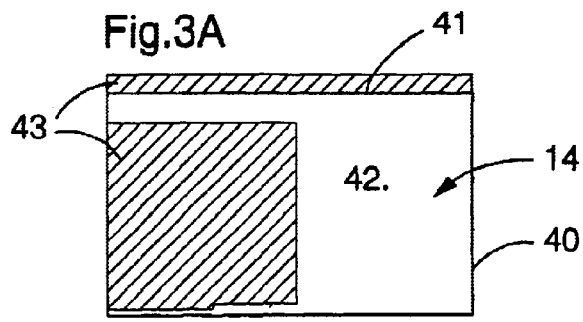
FIGS. 3A to 3F are plan views showing different steps in the machining of the regions of a layer by EDM milling, each region being characterized by its own geometric configuration.

FIG. 3A shows a layer of the piece to be machined with the original contour 40 and the contour 41 of the piece separating the surfaces 42 to be machined and the remaining surfaces 43 which will not be machined by hatching.

Figure 3B:
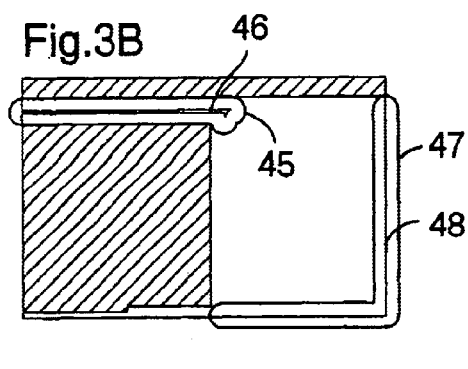

In FIG. 3B, there is indicated a first zone 45 corresponding to the first geometric configuration of closed groove and the path 46 of the center of the electrode-tool to machine this first zone 45. As the piece to be machined has no open groove, there exists no second zone corresponding to the second geometric configuration.

By contrast, FIG. 3B shows a third zone 47 corresponding to the third geometric configuration of the open edge of the rough piece and the path 48 of the center of the electrode-tool to machine this third zone 47 by applying of course the corresponding value of longitudinal wear.

Figure 3C:
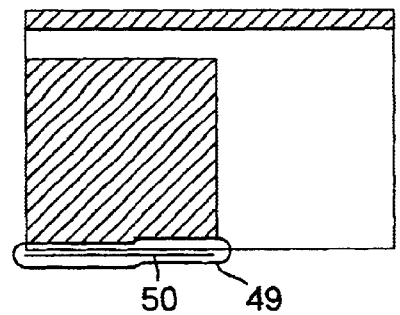

In FIG. 3C, there is shown a fourth zone 49 corresponding to the fourth geometric configuration of the edge of the open edge of the piece, as well as the path 50 of the center of the electrode-tool to machine this fourth zone 49 by applying the corresponding value of longitudinal wear.

Figure 3D:
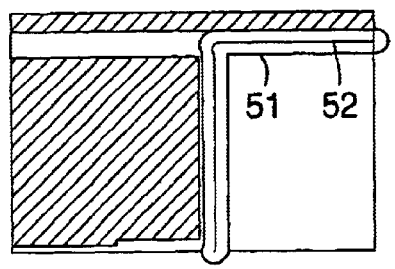

FIG. 3D shows a fifth zone 51 characterized by the fifth geometric configuration of the closed edge of the piece and the path 52 of the center of the electrode-tool to machine this fifth zone by applying the corresponding value of longitudinal wear.

Figure 3E:
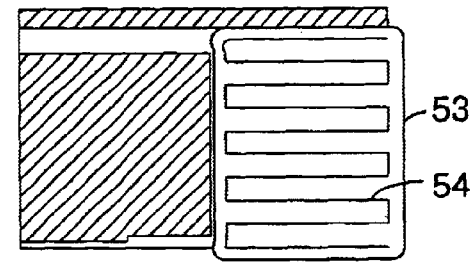

There is then machined the sixth zone 53 having the sixth geometric configuration of sweeping with a path 54 of the center of the electrode-tool and the value of longitudinal wear corresponding to the sweeping (FIG. 3E).

It would remain to carry out machining of a seventh zone corresponding to the seventh configuration of machining of the rest. But in the selected example, the overlap between zones 51 and 53 having been programmed to be sufficiently great, the remaining ridges of material corresponding to the seventh configuration will not exist. It is thus not necessary to generate a path for the center of the electrode-tool.

Figure 3F:
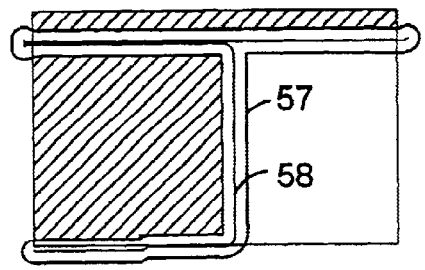

Finally, a finish machining is carried out according to the eighth zone 57 with a path 58 at the center of the electrode-tool and a very low value of longitudinal wear corresponding to finishing conditions (FIG. 3F).

The simulation and machining of this layer are thus concluded and the next layer to be machined can be worked on in a similar fashion.

Of course the embodiment described above is in no way limiting and can be the subject of any desirable modification within the scope as defined by claim 1. In particular, the electroerosion device could have quite another construction with for example a U shaped frame. The relative movements in the directions x, y, z could be carried out entirely or partially by a table on which the piece 14 is mounted.

The computer and simulation modules could be located at another place; the result of the simulation would thus be loaded into the control unit CPU before and/or during machining.

The computer modules, for simulation and regulation and the digital control module could also be combined in a single interactive module loaded into a control computer.

The number and definition of the geometric configurations could be modified. Thus, there could be added supplemental configurations forming intermediate cases between the described geometric configurations. According to modifications of implementation, there could also be performed a simplification by uniting two geometric configurations into a single configuration, for example the second and fourth configurations. Obviously, the precision of the planarity might suffer, but this simplification according to the application could be acceptable as a compromise.

Conversely, two or several modifications of geometric configuration could be defined starting from a typical geometrical configuration; for example, the third and fourth configurations could be broken down into two ranges of lateral offset.

The values of the first and second distances d1, d2 could be different.

Other geometric configurations could be added, such as the presence of an oblique wall, etc.

The zones, regions or segments characterized by a given geometric configuration could be delimited by different programs of image processing. The path of the electrode-tool established by the simulation module could be obtained by any other computer program. These paths could be limited each to a given zone or on the contrary pass through different zones. The value of longitudinal wear of the electrode-tool will however be adapted and modified each time it is desired to penetrate another zone and geometric configuration. Moreover, the chronological sequence of machining of the different zones and geometric configurations could be different and suitable to the general geometry of the rough piece and the shapes to be given to the piece by erosion.

In a more perfected embodiment of the invention, it will be provided that the tool sweep all the surface of a layer more and more closely, as if the whole layer were to constitute in appearance a single zone.

The division into separate zones will not be apparent by observing the machining of the piece but only at the level of the digital control where the parameters of the regulator will change instantaneously during passage of the boundary between two adjacent zones.

What is claimed is:

1. Process to machine a three-dimensional piece (14) by milling with an electroerosion device, according to which an electrode-tool (31) of cylindrical shape whose diameter (2R) is small relative to the dimensions of the surfaces to be eroded, is driven in rotation, the three-dimensional relative movement (x, y, z) between the electrode-tool (31) and said piece (14) is controlled by means of a digital control unit (CN), there are recorded by computer means (MI) the shapes to be machined in the form of a superposition of virtual layers (33), a path of an electrode-tool (31) is simulated, such that this latter sweeps groove by groove, successively, each of the virtual layers, and the corresponding control signals are transmitted toward the digital control unit (CN) to carry out machining layerwise, by regulation means (MR), the longitudinal wear of the electrode-tool along its trajectory is simulated and corresponding compensation signals are transmitted to the digital control unit (CN) so as to compensate this longitudinal wear and to maintain the movement of the end of the electrode-tool parallel to said layers (33), characterized by the fact that, there are provided several values for longitudinal wear of the electrode-tool (1) according to the mutual geometric configuration between the electrode-tool (31) and the nearby material of said piece (14), that values of compensation signals corresponding to each of these values are transmitted to the digital control unit (CN), and that said values take account of the geometric configuration of the flow between the electrode-tool (31) and the nearby material, of a machining liquid used for machining.

2. Process according to claim 1, characterized by the fact that there is determined for each layer, different zones or regions of machining within which there exists a given geometric configuration, that there is simulated and/or carried out with the tool a sweeping of the surface of a layer and that the compensation signals are changed each time the tool enters a different zone or region of machining.

3. Process to machine a three-dimensional piece (14) by milling with an electroerosion device, according to which an electrode-tool (31) of cylindrical shape whose diameter (2R) is small relative to the dimensions of the surfaces to be eroded, is driven in rotation, the three-dimensional relative movement (x, y, z) between the electrode-tool (31) and said piece (14) is controlled by means of a digital control unit (CN), there are recorded by computer means (MI) the shapes to be machined in the form of a superposition of virtual layers (33), a path of an electrode-tool (31) is simulated, such that this latter sweeps groove by groove, successively, each of the virtual layers, and the corresponding control signals are transmitted toward the digital control unit (CN) to carry out machining layerwise, by regulation means (MR), the longitudinal wear of the electrode-tool along its trajectory is simulated and corresponding compensation signals are transmitted to the digital control unit (CN) so as to compensate this longitudinal wear and to maintain the movement of the end of the electrode-tool parallel to said layers (33), characterized by the fact that there are provided several values for longitudinal wear of the electrode-tool (1) according to the mutual geometric configuration between the electrode-tool (31) and the nearby material of said piece (14), that values of compensation signals corresponding to each of these values are transmitted to the digital control unit (CN), and that said values take account on the one hand of the presence or absence of an opening in the nearby material located below the end of the electrode-tool facilitating the flow of the machining liquid, and on the other hand of the presence or absence of at least one or two walls of the nearby material located at a distance from the electrode-tool (31) which is smaller than a first predetermined distance.

4. Process according to claim 3, characterized by the fact that an electrode-tool (31) is used which is in the form of a hollow tube provided with an axial bore (32) and by the fact that said values take account of the presence or absence of communication between the axial bore (32) and said opening (35) in the nearby material.

5. Process according to claim 3, characterized by the fact that values of longitudinal wear are fixed for the following geometric configurations:

a first configuration defined by the presence of at least two walls spaced by a distance less than a second maximum predetermined distance and by the absence of an opening below the electrode-tool;

a second configuration defined by the presence of at least two walls spaced by a distance less than the maximum predetermined distance and by the presence of an opening below the electrode-tool;

a third configuration defined by the absence of a wall located at a distance less than the first predetermined distance of the electrode-tool and the presence of an opening below the electrode-tool;

a fourth configuration defined by the presence of a wall located at a distance less than the first predetermined distance from the electrode-tool and the presence of an opening below the electrode-tool;

a fifth configuration defined by the presence of a wall located at a distance less than the first predetermined distance and the absence of an opening below the electrode-tool;

a sixth configuration defined by the absence of a wall located at a distance less than the first predetermined distance and by the absence of an opening below the electrode-tool.

6. Process according to claim 5, characterized by the fact that moreover the values of longitudinal wear are fixed for the following configurations:

a seventh configuration to machine the material left at the margins of the preceding geometric configurations and between these latter; and an eighth configuration to carry out one or several finishing machinings.

7. Process according to claim 5, characterized by the fact that there is determined with the help of simulation means (6) for each layer, different zones or regions of machining within which there exist one of said geometric configurations and that there is simulated and/or carried out a path of the electrode-tool (31) in the zones or regions of machining by using the values of longitudinal wear corresponding to said geometric configurations.

8. Process according to claim 7, characterized by the fact that there is carried out machining of the zones or regions of machining in increasing order starting from said first configuration until the last geometric configuration while preserving the freedom of rearranging the five first configurations only.

9. Process according to claim 3, characterized by the fact that there is determined for each layer, different zones or regions of machining within which there exists a given geometric configuration, that there is simulated and/or carried out with the tool a sweeping of the surface of a layer and that the compensation signals are changed each time the tool enters a different zone or region of machining.

10. Process to machine a three-dimensional piece (14) by milling with an electroerosion device, according to which an electrode-tool (31) of cylindrical shape whose diameter (2R) is small relative to the dimensions of the surfaces to be eroded, is driven in rotation, the three-dimensional relative movement (x, y, z) between the electrode-tool (31) and said piece (14) is controlled by means of a digital control unit (CN), there are recorded by computer means (MI) the shapes to be machined in the form of a superposition of virtual layers (33), a path of an electrode-tool (31) is simulated, such that this latter sweeps groove by groove, successively, each of the virtual layers, and the corresponding control signals are transmitted toward the digital control unit (CN) to carry out machining layerwise, by regulation means (MR), the longitudinal wear of the electrode-tool along its trajectory is simulated and corresponding compensation signals are transmitted to the digital control unit (CN) so as to compensate this longitudinal wear and to maintain the movement of the end of the electrode-tool parallel to said layers (33), characterized by the fact that there are provided several values for longitudinal wear of the electrode-tool (1) according to the mutual geometric configuration between the electrode-tool (31) and the nearby material of said piece (14), that values of compensation signals corresponding to each of these values are transmitted to the digital control unit (CN), and that there is fixed for each of the geometric configurations a value of longitudinal machining, by machining with pre-established values, by measuring the real longitudinal wear for the geometric configurations, and by replacing the pre-established values by measured values of longitudinal wear.

11. Device for machining by electroerosion to machine a piece (14) with three dimensions by layerwise electroerosion milling, comprising a member to drive in rotation an electrode-tool (31) of cylindrical shape whose diameter (R) is small relative to the dimensions of the surfaces to be eroded, a digital control unit (CN) adapted to control the relative three-dimensional movement between the electrode-tool (31) and the piece (14), a computer module (MI) permitting recording the shapes to be machined in the form of a superposition of virtual layers, a simulation module (MS) permitting simulating a path of the electrode-tool (31) such that this latter sweeps groove by groove, successively each of the virtual layers (33) and arranged to transmit corresponding control signals to the digital control unit (CN), a regulation module (MR) permitting simulating the longitudinal wear of the electrode-tool and its compensation along its path and to transmit toward the digital control unit (CN) compensation signals such as to regulate and compensate this longitudinal wear to maintain the movement of the end of the electrode-tool parallel to said layers, characterized by the fact that the regulation module (MR) is arranged to provide several values of longitudinal wear of the electrode-tool according to the mutual geometric configuration between the electrode-tool (31) and the nearby material of the piece (14) and to transmit compensation signals corresponding to each of these values to the digital control unit (CN) and that the regulation module (MR) is arranged to provide several values of longitudinal wear taking account of the geometric configuration of the flow between the electrode-tool (31) and the nearby material, of a machining liquid used for machining.

12. Device for machining by electroerosion to machine a piece (14) with three dimensions by layerwise electroerosion milling, comprising:

a member to drive in rotation an electrode-tool (31) of cylindrical shape whose diameter (R) is small relative to the dimensions of the surfaces to be eroded, a digital control unit (CN) adapted to control the relative three-dimensional movement between the electrode-tool (31) and the piece (14), a computer module (MI) permitting recording the shapes to be machined in the form of a superposition of virtual layers, a simulation module (MS) permitting simulating a path of the electrode-tool (31) such that this latter sweeps groove by groove, successively each of the virtual layers (33) and arranged to transmit corresponding control signals to the digital control unit (CN), a regulation module (MR) permitting simulating the longitudinal wear of the electrode-tool and its compensation along its path and to transmit toward the digital control unit (CN) compensation signals such as to regulate and compensate this longitudinal wear to maintain the movement of the end of the electrode-tool parallel to said layers, characterized by the fact that the regulation module (MR) is arranged to provide several values of longitudinal wear of the electrode-tool according to the mutual geometric configuration between the electrode-tool (31) and the nearby material of the piece (14) and to transmit compensation signals corresponding to each of these values to the digital control unit (CN) and that the regulation module (MR) is arranged to begin machining with pre-established values of longitudinal wear, to measure the real longitudinal wear for each of the geometric configurations, and to replace the pre-established values by the measured values of longitudinal wear.

13. Device for machining by electroerosion to machine a piece (14) with three dimensions by layerwise electroerosion milling, comprising a member to drive in rotation an electrode-tool (31) of cylindrical shape whose diameter (R) is small relative to the dimensions of the surfaces to be eroded, a digital control unit (CN) adapted to control the relative three-dimensional movement between the electrode-tool (31) and the piece (14), a computer module (MI) permitting recording the shapes to be machined in the form of a superposition of virtual layers, a simulation module (MS) permitting simulating a path of the electrode-tool (31) such that this latter sweeps groove by groove, successively each of the virtual layers (33) and arranged to transmit corresponding control signals to the digital control unit (CN), a regulation module (MR) permitting simulating the longitudinal wear of the electrode-tool and its compensation along its path and to transmit toward the digital control unit (CN) compensation signals such as to regulate and compensate this longitudinal wear to maintain the movement of the end of the electrode-tool parallel to said layers, characterized by the fact that the regulation module (MR) is arranged to provide several values of longitudinal wear of the electrode-tool according to the mutual geometric configuration between the electrode-tool (31) and the nearby material of the piece (14) and to transmit compensation signals corresponding to each of these values to the digital control unit (CN) and that the regulation module (MR) is arranged so as to take account, during simulation of the values of longitudinal machining, on the one hand of the presence or absence of an opening in the nearby material located below the end of the electrode-tool (31) facilitating the flow of the machining liquid, and on the other hand of the presence or absence of at least one or two walls of the nearby material located at a distance from the electrode-tool (31) which is smaller than a first predetermined distance.

14. Device according to claim 13, characterized by the fact that the electrode-tool (31) is in the form of a hollow tube provided with an axial bore (32) and by the fact that said values of longitudinal wear take account of the presence or absence of communication between the axial bore and said opening (35) in the nearby material.

15. Device according to claim 13, characterized by the fact that the regulation module (MR) is arranged so as to provide a value of longitudinal wear for each of the geometric configurations 1 to 6, namely a first configuration defined by the presence of at least two walls spaced by a distance less than a second maximum predetermined distance and by the absence of an opening below the electrode-tool;

a second configuration defined by the presence of at least two walls spaced by a distance less than the maximum predetermined distance and by the presence of an opening below the electrode-tool;

a third configuration defined by the absence of a wall located at a distance less than the first predetermined distance of the electrode-tool and the presence of an opening below the electrode-tool;

a fourth configuration defined by the presence of a wall located at a distance less than the first predetermined distance from the electrode-tool and the presence of an opening below the electrode-tool;

a fifth configuration defined by the presence of a wall located at a distance less than the first predetermined distance and the absence of an opening below the electrode-tool;

a sixth configuration defined by the absence of a wall located at a distance less than the first predetermined distance and by the absence of an opening below the electrode-tool.

16. Device according to claim 15, characterized by the fact that the regulation module (MR) is moreover arranged to provide a value of longitudinal wear for the following configurations:

a seventh configuration to machine the material left at the edge of the preceding geometric configuration and between these latter; and an eighth configuration to carry out one or several finishing machinings.

17. Device according to claim 15, characterized by the fact that the simulation module (MS) is arranged so as to determine for each layer different zones or regions of machining within which there exists one of said geometric configurations and that the simulation and regulation modules (MS, MR) are arranged to simulate and/or to control a path of the electrode-tool in these zones or regions of machining by applying the values of longitudinal wear corresponding to said geometric configurations.

18. Device according to claim 17, characterized by the fact that the simulation and regulation modules (MS, MR) are arranged to carry out machining of the zones or regions of machining in increasing order starting from the $1^{st}$ configuration to the last configuration.

* * * * *